United States Patent [19]

Elmer

[11] Patent Number: 4,569,497
[45] Date of Patent: Feb. 11, 1986

[54] METER LEVELING SADDLE

[75] Inventor: Michael T. Elmer, Evansville, Wyo.

[73] Assignee: Scott Equipment Company, Wheatridge, Colo.

[21] Appl. No.: 517,634

[22] Filed: Jul. 27, 1983

[51] Int. Cl.$^4$ ............................................. A47G 29/00
[52] U.S. Cl. .................................. 248/230; 248/180; 248/DIG. 4
[58] Field of Search ................. 248/230, DIG. 4, 231, 248/180, 185, 178

[56] References Cited

U.S. PATENT DOCUMENTS

| | | | |
|---|---|---|---|
| 1,221,507 | 4/1917 | Buesse | 248/231 |
| 1,447,212 | 3/1923 | Kerr | 248/180 |
| 1,985,951 | 1/1935 | Richterkessing | 248/230 |
| 2,264,553 | 12/1941 | Robinson | 248/346 |
| 2,634,939 | 4/1953 | Voss | 248/231 |
| 2,683,011 | 7/1954 | Haggerty | 248/180 |
| 2,689,102 | 9/1954 | Whalen | 248/230 |
| 2,696,673 | 12/1954 | Kingman | 248/180 |
| 3,018,081 | 1/1962 | Waldbauer | 248/230 |
| 3,241,800 | 3/1966 | Richter | 248/231 |
| 3,685,858 | 8/1972 | Wandler | 285/27 |
| 4,079,481 | 3/1978 | Cacicedo | 16/158 |
| 4,284,257 | 8/1981 | Murkens | 248/DIG. 4 |

Primary Examiner—Reinaldo P. Machado
Assistant Examiner—Alvin Chin-Shue
Attorney, Agent, or Firm—W. Scott Carson

[57] ABSTRACT

A mounting for adjustably securing a meter to a pipe. The preferred embodiment of the mounting includes a one-piece, unitary saddle member, leveling member, and U-bolt which extends substantially about the pipe and is attached to the saddle member to secure it to the pipe. The saddle member has front and rear portions with the leveling member being mounted to the front portion of the saddle member. The rear portion of the saddle member has two serrated sections extending outwardly of the center of the saddle member and the mounting sits on the pipe with only the leveling member and each of the two sections of the rear portion engaging the pipe. In operation, the saddle member is rotated about the longitudinal axis of the pipe to the desired position and secured in place with the U-bolt. The saddle member is then pivoted generally about an axis transverse to the pipe's axis by selectively moving the leveling member to raise or lower the front portion and rock the saddle member about the two sections engaging the pipe. The two sections flare outwardly for fitting a wide variety of different sized pipes while still maintaining the seating of the mounting as a three point or area contact on the pipe. Additionally, the serrations have rounded end portions so that the saddle member can be easily and smoothly rocked about them to position the meter in a true vertical orientation for proper operation.

19 Claims, 5 Drawing Figures

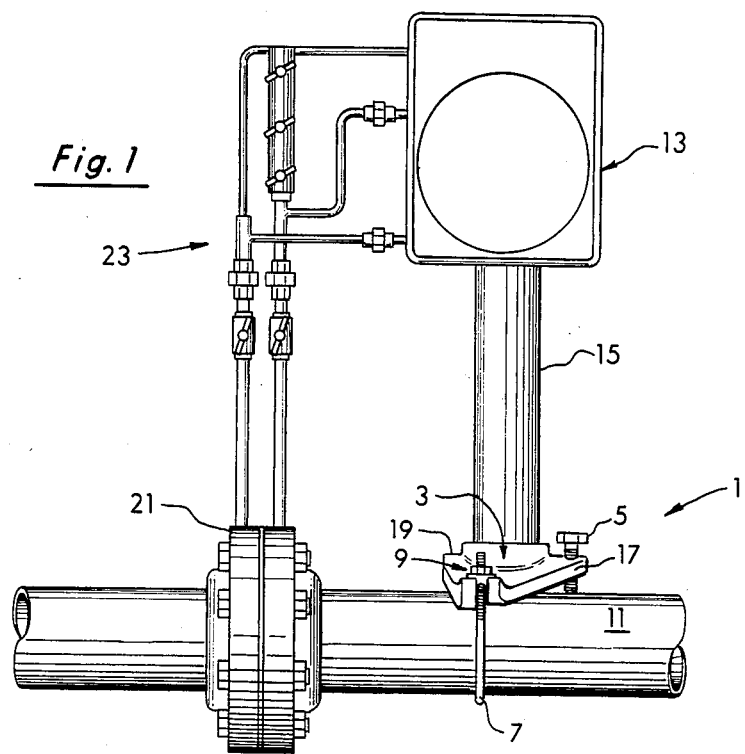
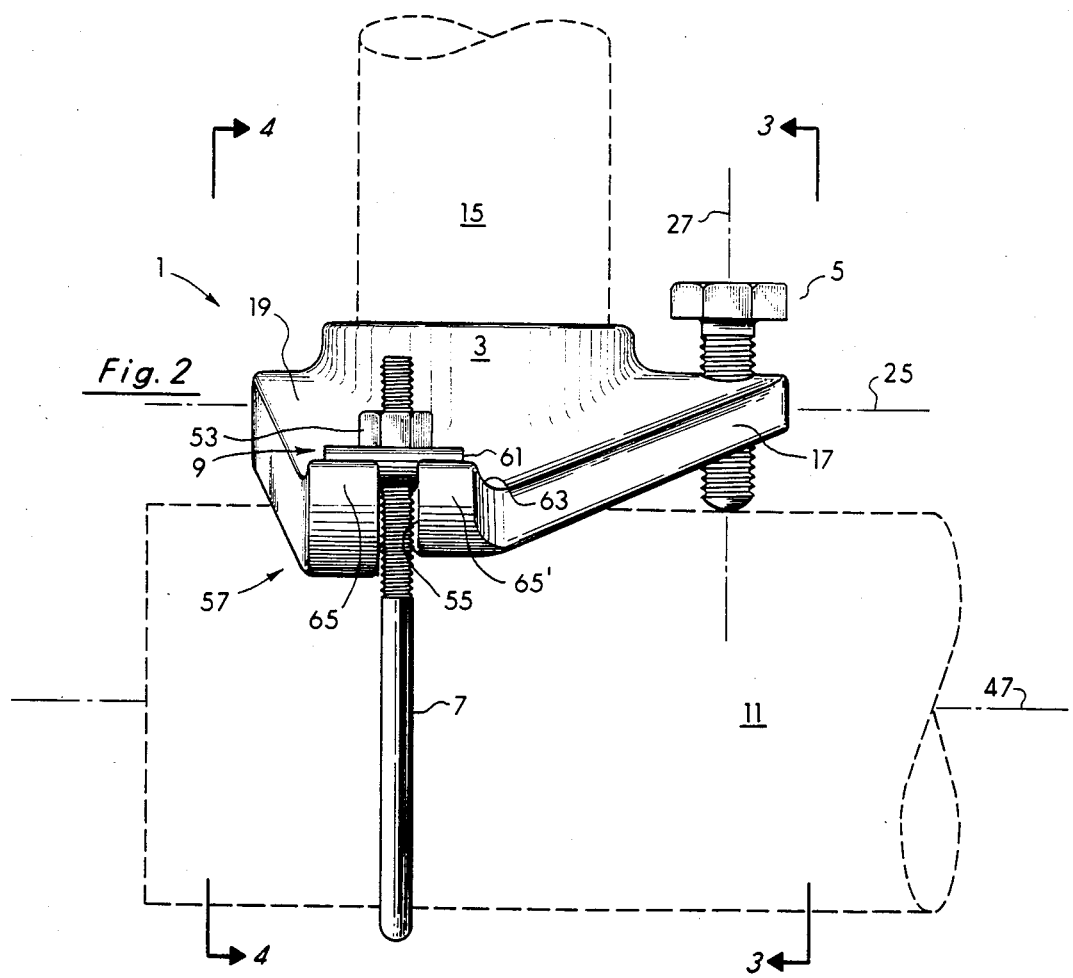

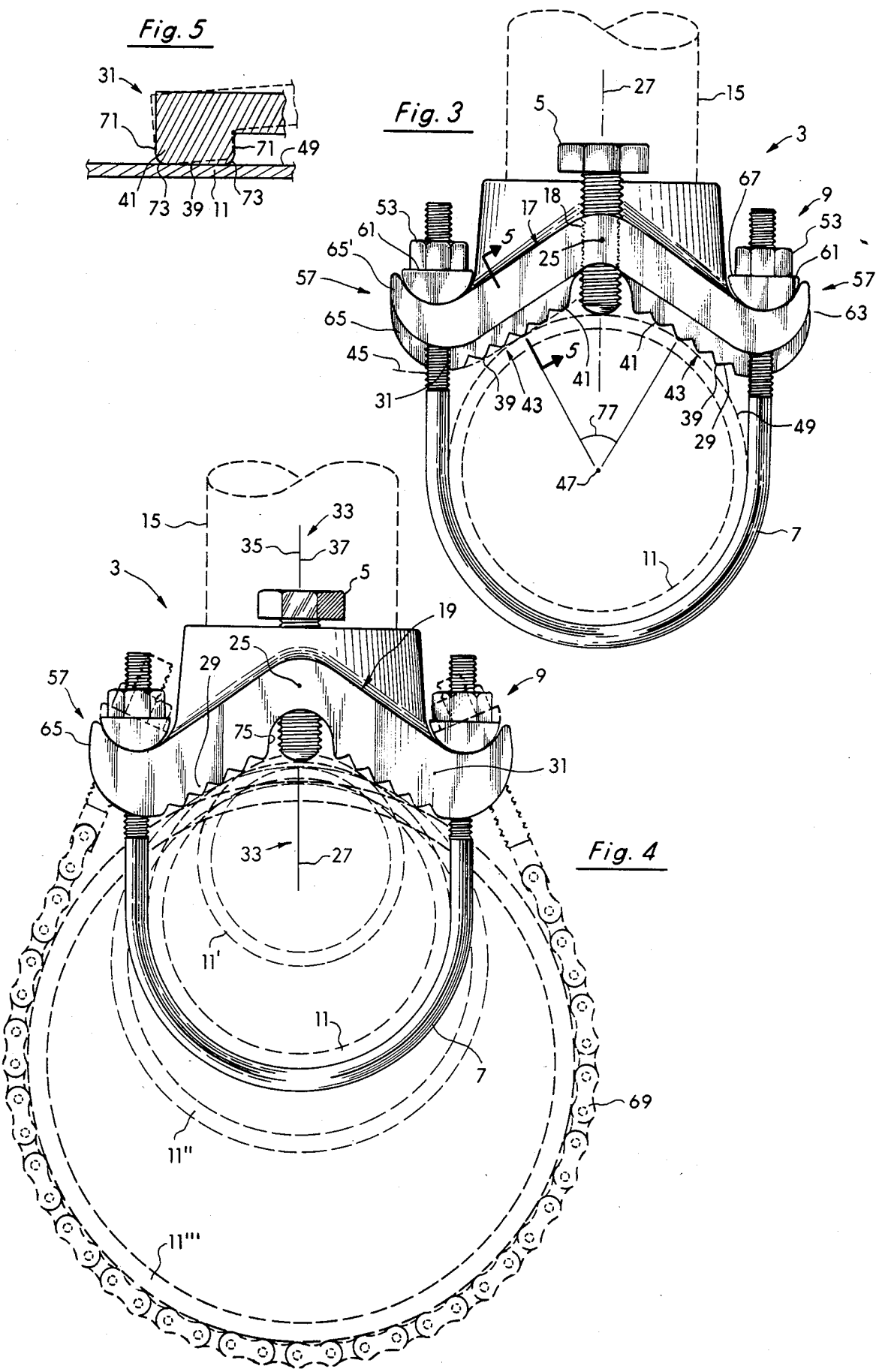

METER LEVELING SADDLE

FIELD OF THE INVENTION

This invention relates to the field of meter leveling saddles for securing meters to pipes in a true vertical position for proper operation of the meter.

BACKGROUND OF THE INVENTION AND PRIOR ART

Meter leveling saddles are widely used to mount flow meters to pipes. With such meters, proper operation for accurate readings is paramount and such proper operation is in large part dependent upon supporting the meter on the pipe in a true vertical position.

The most commonly used meter mounting is believed to be the one of U.S. Pat. No. 2,264,553 to Robinson. This patented mounting includes a two-piece saddle having a first part or base which is mounted on the pipe and a second part which is pivotly mounted to the base and carries the meter. In operation, the base is rotated about the pipe's longitudinal axis to the desired position and secured in place against tipping and rocking on the pipe by a U-bolt (see lines 47–50 of column 2 on page 1 of the patent). The second or top part is then leveled about an axis transverse to the pipe's axis by manipulating two bolts. In contrast to this patented mounting, the mounting of the present invention has a one-piece saddle offering significant savings in weight and complexity of design. It also offers enhanced simplicity of operation in that the leveling about the axis transverse to the pipe's axis is accomplished by manipulating a single bolt rather than the two bolts of Robinson. Further, the single bolt of the present invention contacts the pipe directly and forms part of the seating engagement of the mounting on the pipe. Since the bolt is adjustable and taken with the unique, flaring design of the rear portion of the saddle engaging the pipe, a wide variety of different sized pipes can be readily fitted with the mounting of the present invention. This is in contrast to the design of Robinson whose base engages the pipe at three fixed areas limiting the range of pipe sizes it will fit (see lines 47–50 of column 2 on page 2 of the patent) and requiring a user not only to maintain an inventory of different sized bases but also to carry different sized bases into the field if the exact size of the pipe or pipes is not known ahead of time.

Other mountings in this general area are U.S. Pat. No. 3,685,858 to Wandler (which like Robinson calls for the manipulation of two bolts) and U.S. Pat. No. 4,079,481 to Cacicedo.

SUMMARY OF THE INVENTION

This invention involves a mounting for adjustably securing a meter to a pipe. The preferred embodiment of the mounting includes a one-piece, unitary saddle member, leveling member, and U-bolt which extends substantially about the pipe and is attached to the saddle member to secure it to the pipe. The saddle member has front and rear portions with the leveling member (which is preferably a threaded bolt) being mounted to the front portion of the saddle member. The rear portion of the saddle member has two sections extending outwardly of the center of the saddle member. Each section has serrations thereon and the mounting sits on the pipe with only the leveling member and each of the two sections of the rear portion engaging the pipe. The meter is mounted to the saddle member between the front and rear portions and the three areas contacting the pipe (i.e., leveling member and two sections of the rear portion of the saddle member) form an isosceles triangle with the base extending between the two sections and the leveling member engaging the pipe equidistant from the two sections.

In operation, the saddle member is rotated about the longitudinal axis of the pipe to the desired position and secured in place with the U-bolt. The saddle member is then pivoted generally about an axis transverse to the pipe's axis by selectively moving the leveling member to raise or lower the front portion and rock the saddle member about the two sections engaging the pipe. The two sections flare outwardly and can be used on a wide variety of different sized pipes; and, although different parts of the two sections engage pipes of varying sizes, the seating of the mounting is always a three point or area contact on the pipe. Additionally, the serrations on the two sections have rounded end portions so that the saddle member can be easily and smoothly rocked about them to position the meter in a true vertical orientation for proper operation.

BRIEF DESCRIPTION OF THE FIGURES

FIG. 1 is a side elevational view of the mounting of the present invention supporting a typical flow meter on a horizontally extending pipe.

FIG. 2 is an enlarged side elevation of the mounting illustrating the relationship of the saddle member, leveling bolt, and U-bolt for securing the saddle member to the pipe.

FIG. 3 is a view taken along line 3—3 of FIG. 2 illustrating the manner in which the mounting of the present invention engages the pipe at the leveling bolt and two outwardly extending, serrated sections of the saddle member.

FIG. 4 is a view taken along line 4—4 of FIG. 3 illustrating the manner in which the mounting engages the pipe of FIG. 3. FIG. 4 additionally illustrates the versatility of the mounting wherein it can engage a wide variety of different sized pipes while still maintaining a three point or area engagement with the pipe at the leveling bolt and two outwardly extending, serrated sections of the saddle member.

FIG. 5 is a view taken along line 5—5 of FIG. 3 illustrating the rounded areas of the serrations which enable the saddle member to easily and smoothly rock in response to manipulation of the leveling bolt to properly orient the attached meter in a true vertical position for proper operation.

DETAILED DESCRIPTION OF THE PREFERRED EMBODIMENTS

Referring to FIGS. 1 and 2, the mounting 1 of the present invention includes saddle member 3, leveling member or bolt 5, and U-bolt 7 which is attached at 9 to the saddle member 3 and secures the saddle member 3 to the pipe 11. The flow meter 13 is mounted by the pipe 15 to the saddle member 3 between the front and rear portions 17 and 19 of the saddle member 3. Pipe 15 is preferably threaded at least at one end with the saddle member 3 having mating threads to tightly receive the pipe 15 and hold the meter 13 (which can be similarly secured to the pipe 15 by mating threads or other means if desired) in a predetermined, fixed position relative to the saddle member 3. The flow meter 13 (e.g., orifice meter) can be linked to the pipe 11 at orifice fitting 21 by the arrangement of 23 or in any other well known manner.

As best seen in FIG. 2, the saddle member 3 has front and rear portions 17 and 19 spaced from each other along axis 25. The front portion 17 has mating threads 18 (see FIG. 3) for receiving the leveling bolt 5 whereby the leveling bolt 5 can be rotated about the axis 27 to selectively move it relative to the front portion 17 along the axis 27. Axis 27 is preferably perpendicular to the axis 25 and as best seen in FIG. 4, the first and second serrated sections 29 and 31 of the rear portion 19 respectively extend outwardly of a plane 33 containing the perpendicular and intersecting axis 25 and 27. The plane 33 is seen on edge in FIG. 4 and the sections 29 and 31 are shown to extend symmetrically outwardly from opposite sides 35 and 37 of the plane 33. The sections 29 and 31 flare outwardly of the plane 33; and, as best illustrated in FIG. 3, the ridges 39 of the series of tooth members 41 forming the serrations 43 on each section 29 and 31 respectively lie in a surface 45 (illustrated for section 31 only) which is generally convex to the longitudinal axis 47 of the pipe 11. In this manner as seen in FIG. 4, the saddle member 3 can accommodate a wide variety of different sized pipes 11-11‴ with different ones of the ridges 39 engaging the pipes.

The mounting 1 is preferably seated on the pipe 11 only by the engagement of the leveling bolt 5 at its ball point and the first and second sections 29 and 31 of the rear portion 19 of the saddle member 3. Ideally, the engagement of the sections 29 and 31 is along only one ridge 39 of each section but may be along more. In any event, the seating means of leveling bolt 5 and sections 29 and 31 engage the outer surface 49 of the pipe 11 only at these three points or areas. The mounting 1 is symmetrical about the plane 33 and the three engaging areas of leveling bolt 5 and sections 29 and 31 form an isosceles triangle with a line between the contact areas of sections 29 and 31 being the base and the engagement of the leveling bolt 5 being equidistant from the engagement areas of the sections 29 and 31. As shown in FIG. 4, the contact or engagement areas of sections 29 and 31 vary depending upon the size of the pipe but the symmetry and three point or area engagement discussed above is always present for a firm and stable seating of the mounting 1 on the pipe.

In operation, the mounting 1 and attached meter 13 can be leveled on the pipe 11 by engaging the seating means (leveling bolt 5 and sections 29 and 31) of the mounting 1 with the outer surface 49 of the pipe 11 with the axes 25 and 47 substantially parallel. The saddle member 3 and leveling bolt 5 can then be rotated as a unit relative to the pipe 11 about the pipe's longitudinal axis 47 to the desired position and secured in place by tightening the nuts 53 on the ends of the U-bolt 7. As seen in FIGS. 2 and 3, the ends of the U-bolt 7 are received in the outwardly opening slots 55 in the pair of ears 57 on the saddle member 3. Once the mounting 1 is secured in place in the desired position about the longitudinal axis 47 of the pipe 11, the saddle member 3 can then be pivoted about the first and second sections 29 and 31 of the rear portion 19 of the saddle member 3 to raise or lower the front portion 17. This is accomplished by selectively moving the leveling bolt 5 along the axis 27 (see FIGS. 2 and 3). In this manner, the mounting 1 and attached meter 13 can be easily and quickly secured to and leveled on the pipe 11 for proper orientation and operation of the meter 13.

The U-bolt 7 is selectively attached at 9 to the saddle member 3 by nuts 53 and half round washers 61. As discussed above, the U-bolt 7 extends substantially about the pipe 11 and its ends are received in the slots 55 in the ears 57 which are symmetrically located with one ear 57 on either side of the symmetry plane 33. The upper surface 63 (see FIGS. 2 and 3) of each tab 65 and 65′ of each ear 57 adjacent the slot 55 is concave with each washer 61 having a substantially mating convex surface 67. In this manner, the ears 57 and half round washers 61 can accommodate different sized U-bolts and even securing means with flexible portions such as the chain 69 which conforms to the shape of the pipe as shown in dotted lines in FIG. 4. As illustrated in FIG. 4, the half round washers 61 rotate to assume a conforming position on the surfaces 63 depending upon the angles the ends of the securing means make with the symmetry plane 33 of the saddle member 3.

To facilitate the rocking or pivoting of the saddle member 3 about sections 29 and 31 in response to the manipulation of the leveling bolt 5, the end portions 71 of the teeth 41 (see FIG. 5) have rounded areas 73 adjacent the ridges 39. In this manner, the saddle member 3 can be easily and smoothly rocked from a position in which a limited number of ridges 39 (and preferably only one) on each section 29 and 31 fully contact the outer surface 49 of the pipe 11 to a position as shown in dotted lines in FIG. 5 in which the sections engage the pipe 11 at a rounded area 73. The indention 75 in the rear portion 19 of the saddle member 3 (see FIG. 4) is symmetrically positioned between the section 29 and 31 and receives the pipe 11 as the saddle member is rocked or pivoted to raise the front portion 17. The ridges 39 are preferably parallel to the axis 25 and depending upon the operation of the leveling bolt 5, the saddle member 3 rocks about an axis transverse to the pipe's longitudinal axis 47 through either the rearward rounded area 73 (on the left in FIG. 5) or the forward area 73 (on the right in FIG. 5). However, in all modes of operation and regardless of the size of the pipe, the mounting 1 preferably engages the pipe at 3 points or areas (i.e., the leveling bolt 5 and section 29 and 31) with the three areas engaging the outer surface of the pipe within a common radial section 77 (see FIG. 3) about the axis 47 of approximately 60°. Also, as best seen in FIGS. 1 and 2, the elongated member 7 preferably extends about the pipe 11 in a plane substantially perpendicular to the axis 47 and is positioned by the ears 57 so that this plane is substantially closer to the engagement areas of the sections 29 and 31 than to the axis 27 of the leveling member 5.

While several embodiments of the present invention have been described in detail herein, it is understood that various changes and modifications can be made without departing from the scope of the invention.

I claim:

1. A mounting primarily intended for adjustably securing a meter to a pipe, said pipe having inner and outer surfaces extending about a first axis and said mounting includes:

a saddle member, leveling member, and means for securing said saddle member to said pipe, said securing means comprising a single, elongated member extending substantially about said pipe, and axially spaced along said first axis from said leveling member, and means for selectively attaching said member to said saddle member, said saddle member being a one-piece, unitary member having front and rear portions spaced from each other along a second axis, said front portion having means for mounting said leveling member thereto for movement relative to said front portion along a third axis substantially perpendicular to said second axis, and said rear portion having first and second sections respectively extending outwardly of a plane containing said second and third axes, and said mounting further including seating means for engaging the outer surface of said pipe, said seating means comprising only said leveling member and said first and second sections of said rear portion of said saddle member whereby said mounting engages the outer surface of said pipe only at the three areas of the leveling member and the first and second sections and wherein said attaching means further includes means for positioning the plane in which said single, elongated member extends to be substantially closer to the engagement areas of said two sections than to said third axis whereby said mounting and any meter attached thereto can be leveled on said pipe by engaging said seating means of said mounting with the outer surface of said pipe with said first and second axis substantially parallel, rotating said saddle member and leveling member as a unit relative to said pipe about said first axis to a desired position, securing said saddle member and leveling member to said pipe in said desired position by selectively operating said attaching means, and selectively moving said leveling member along said third axis to move said front portion of the saddle member relative to said pipe and pivot said saddle member about said first and second sections of said rear portion of said saddle member.

2. The mounting of claim 1 wherein said member of said securing means in a U-bolt.

3. The mounting of claim 1 wherein said member of said securing means has a flexible portion extending substantially about and substantially conforming to the shape of the outer surface of said pipe.

4. The mounting of claim 1 wherein said leveling member has a portion with screw threads and said mounting means for said leveling member on said front portion of said saddle member includes a portion with mating screw threads to the screw threads of said leveling member whereby said leveling member is selectively moved along said third axis by rotating said leveling member relative to said front portion about said third axis.

5. The mounting of claim 1 wherein said leveling member engages said pipe substantially equidistant from the engagements of said first and second sections with said pipe.

6. The mounting of claim 1 wherein said first and second sections of said rear portion of said saddle member have serrations thereon.

7. The mounting of claim 6 wherein the serrations on each of said first and second sections are a series of tooth members with each tooth member having end portions spaced from each other and a ridge substantially parallel to said second axis extending between said end portions.

8. The mounting of claim 1 wherein said saddle member includes a pair of ears extending outwardly of said plane containing said second and third axes, each of said ears having a slot therein opening outwardly of said plane and receiving a part of said member of said securing means therein.

9. The mounting of claim 8 wherein each of said ears has a concave surface adjacent said slot and said attaching means of said securing means includes a pair of members having convex surfaces substantially mating with the concave surfaces of said ears, said pair of members respectively having means for receiving a part of said member of said securing means therein.

10. The mounting of claim 9 wherein said member of said securing means is a U-bolt, said U-bolt having ends respectively receivable within said pair of members and said slots of said ears.

11. The mounting of claim 10 wherein said pair of members are half round washers.

12. The mounting of claim 1 further including a meter and means for mounting said meter to said saddle in a predetermined, fixed position relative to said saddle member.

13. The mounting of claim 12 wherein said meter mounting means mounts said meter to said saddle member between said front and rear portions of said saddle member.

14. The mounting of claim 1 wherein said outer surface of said pipe extends radially about said first axis for 360° and said first and second sections and said leveling member engage said outer surface within a common radial section thereof of less than 180°.

15. The mounting of claim 14 wherein said radial section is less than 90°.

16. The mounting of claim 15 wherein said radial section is approximately 60°.

17. A mounting primarily intended for adjustably securing a meter to a pipe, said pipe having inner and outer surfaces extending about a first axis and said mounting includes:

a saddle member, leveling member, and means for securing said saddle member to said pipe, said securing means including a member extending substantially about said pipe, and axially spaced along said first axis from said leveling member, and means for selectively attaching said member to said saddle member, said saddle member having front and rear portions spaced from each other along a second axis, said front portion having means for mounting said leveling member thereto for movement relative to said front portion along a third axis substantially perpendicular to said second axis, and said rear portion having first and second sections respectively extending outwardly of a plane containing said second and third axes, and said mounting further including seating means for engaging the outer surface of said pipe, said seating means including said leveling member and said first and second sections of said rear portion of said saddle member whereby said mounting and any meter attached thereto can be leveled on said pipe by engaging said seating means of said mounting with the outer surface of said pipe with said first and second axis substantially parallel, rotating said saddle member and leveling member as a unit relative to said pipe about said first axis to a desired position, securing said saddle member and leveling member to said desired position by selectively operating said attaching means, and selectively moving said leveling member along said third axis to move said front portion of the saddle member relative to said pipe and pivot said saddle member about said first and second sections of said rear portion of said saddle member and wherein said first and second sections of said rear portion of said saddle member have serrations thereon, said serrations on each of said first and second sections being a series of tooth members with each tooth member having end portions spaced from each other and a ridge substantially parallel to said second axis extending between said end portions and wherein substantially all of said end portions of each tooth member adjacent the respective ridge thereof have a rounded area whereby said saddle member can be easily and smoothly rocked from a first position with at least one ridge of each of said first and second sections engaging said pipe onto at least one of said rounded areas of each section as said leveling member is moved along said third axis to pivot said saddle member.

18. The mounting of claim 17 wherein said first and second sections are spaced from one another and said rear portion has an indention between said sections to receive said pipe as said saddle member is pivoted about said sections in a first direction.

19. A mounting primarily intended for adjustably securing a meter to a pipe, said pipe having inner and outer surfaces extending about a first axis and said mounting includes:

a saddle member, leveling member, and means for securing said saddle member to said pipe, said securing means including a member extending substantially about said pipe, and axially spaced along said first axis from said leveling member, and means for selectively attaching said member to said saddle member, said saddle member having front and rear portions spaced from each other along a second axis, said front portion having means for mounting said leveling member thereto for movement relative to said front portion along third axis substantially perpendicular to said second axis, and said rear portion having first and second section respectively extending outwardly of a plane containing said second and third axes, and said mounting further including seating means for engaging the outer surface of said pipe, said seating means including said leveling member and said first and second sections of said rear portion of said saddle member whereby said mounting and any meter attached thereto can be leveled on said pipe by engaging said seating means of said mounting with the outer surface of said pipe with said first and second axis substantially parallel, rotating said saddle member and leveling member as a unit relative to said pipe about said first axis to a desired position, securing said saddle member and leveling member to said desired position by selectively operating said attaching means, and selectively moving said leveling member along said third axis to move said front portion of the saddle member relative to said pipe and pivot said saddle member about said first and second sections of said rear portion of said saddle member and wherein said first and second sections of said rear portion of said saddle member have serrations thereon, said serration of each of said first and second sections being a series of tooth members with each tooth member having end portions spaced from each other and a ridge substantially parallel to said second axis extending between said end portion and wherein said ridges of said respective first and second sections lie in respective surfaces generally convex to said first axis when said mounting is secured on said pipe wherein different sized pipe would be engaged by a differing ones of said ridges.

* * * * *